United States Patent [19]

Yoshino

[11] 4,382,636
[45] May 10, 1983

[54] DECELERATION-SENSITIVE BRAKE PRESSURE CONTROL DEVICE

[75] Inventor: Masato Yoshino, Itami, Japan

[73] Assignee: Sumitomo Electric Industries, Ltd., Osaka, Japan

[21] Appl. No.: 341,149

[22] Filed: Jan. 20, 1982

Related U.S. Application Data

[63] Continuation of Ser. No. 160,574, Jun. 17, 1980, abandoned.

[30] Foreign Application Priority Data

Oct. 29, 1979 [JP] Japan .................. 54-140602

[51] Int. Cl.³ .............................. B60T 8/14
[52] U.S. Cl. ..................... 303/6 C; 188/349; 303/24 F
[58] Field of Search ............... 303/6 C, 24 A, 24 C, 303/24 F, 24 R, 22 R, 22 A; 188/349, 195

[56] References Cited

U.S. PATENT DOCUMENTS

| | | | |
|---|---|---|---|
| 3,899,217 | 8/1975 | Ohta | 303/6 C X |
| 4,116,493 | 9/1978 | Hayashida | 303/24 A |
| 4,253,707 | 3/1981 | Takata | 303/6 C |
| 4,325,582 | 4/1982 | Kubota et al. | 303/6 C X |

FOREIGN PATENT DOCUMENTS

2917212 10/1979 Fed. Rep. of Germany ... 303/24 A

*Primary Examiner*—Douglas C. Butler
*Attorney, Agent, or Firm*—Wenderoth, Lind & Ponack

[57] ABSTRACT

A deceleration-sensitive brake pressure control device is disclosed which has a pressure proportioning valve, an inertia body, a sealing chamber, a piston and two springs. The piston is adapted to move without affecting the operation of the proportioning valve until its stroke reaches a predetermined value. An orifice is provided upstream of the sealing chamber to cause some delay in the increase in the pressure in the sealing chamber.

4 Claims, 7 Drawing Figures

DECELERATION-SENSITIVE BRAKE PRESSURE CONTROL DEVICE

This is a continuation of application Ser. No. 160,574, filed June 17, 1980, now abandoned.

The present invention relates to a deceleration-sensitive brake pressure control device for controlling the brake fluid pressure for the rear brake of a vehicle.

The brake force supplied to the rear brake of a vehicle should be in accordance with the load condition of the vehicle. It should differ from the unloaded condition to the loaded condition. To meet this requirement, a deceleration-sensitive brake pressure control device is known which detects the deceleration of the vehicle, seals the fluid pressure in the rear brake portion of the brake system upon the occurrence of a predetermined deceleration, said fluid pressure depending on the load condition of the vehicle, and uses the sealed-in fluid pressure to control the cut-in point where a built-in pressure proportioning valve starts to operate to reduce the brake pressure supplied to the rear brake.

In this type of brake pressure control device, an inertia valve is used to seal-in the brake fluid, said inertia valve comprising a valve seat and a ball valve responsive to the inertia force caused upon the occurrence of a deceleration.

Generally, the actual buildup of the deceleration tends to be more or less delayed relative to the buildup of the brake pressure. Upon rapid creation of brake pressure, such as in spike braking (about 400 Kg/cm$^2$/sec or more), therefore, the fluid pressure has increased too much before the inertia valve detects a predetermined deceleration caused by such braking and operates to seal-in the fluid, so that the pressure of the sealed-in fluid and thus the cut-in point will be too high. This means that there is some difference between the fluid pressure actually sealed-in by the inertia valve and the fluid pressure desired to be sealed-in according to the load condition of the vehicle. For example, if rapid braking takes place when the vehicle is in an unloaded condition, a fluid pressure corresponding to the unloaded condition should ideally be sealed-in. On the contrary, due to the delay in sealing-in the fluid pressure, a fluid pressure corresponding to that when the vehicle is in the loaded condition will be sealed-in. This results in too high a cut-in point and thus causes excessive brake force for the rear brake, which can cause dangerous skidding of the rear wheels.

Such an increase in the cut-in point upon rapid braking is not negligible and occurs because operation of the inertia valve is too late relative to the rapid increase of the braking pressure, that is, fluid sealing by the inertia valve which is too late. This is a shortcoming inherent in the use of an inertia valve.

In a conventional control device of this type, the inertia valve chamber communicates with a fluid sealing chamber so that the fluid sealed therein will act on a piston arranged at the end of the sealing chamber and abutting a spring for pushing the plunger of a proportioning valve in the valve opening direction. As a countermeasure to the above-mentioned problem, the provision of an orifice in the fluid circuit to the piston (at the inlet port of the sealing chamber, for example) has been proposed to retard the increase of the fluid pressure acting on the piston to the same extent as the delay in the occurrence of the deceleration, thereby avoiding an undue increase of the cut-in point.

However, this solution has the following drawback. Since the stroke of the piston when the vehicle is in the unloaded condition is designed to be zero or near to zero in conventional arrangements, the fluid flow through the orifice is too small in the unloaded condition to expect a favorable effect from the provision of an orifice. The effect of the orifice does not appear until the piston has moved for some distance. Therefore, this countermeasure is not sufficiently effective to retard the increase of fluid pressure acting on the piston.

Another solution which has been proposed is to provide an orifice at the inlet port to the control device, thereby retarding the increase of fluid pressure acting on the piston. However, this solution has the drawback that the orifice causes some delay in the operation of the rear brake system. If the front brake system should fail, this delay in the operation of the rear brake system can be as dangerous as a delay in operating the brake pedal.

An object of the present invention is to provide a deceleration-sensitive brake pressure control device which does not suffer from an increase of the cut-in point even at a time of rapid braking.

Other objects and features of the present invention will become apparent from the following description taken with reference to the accompanying drawings, in which.

Figure 1:
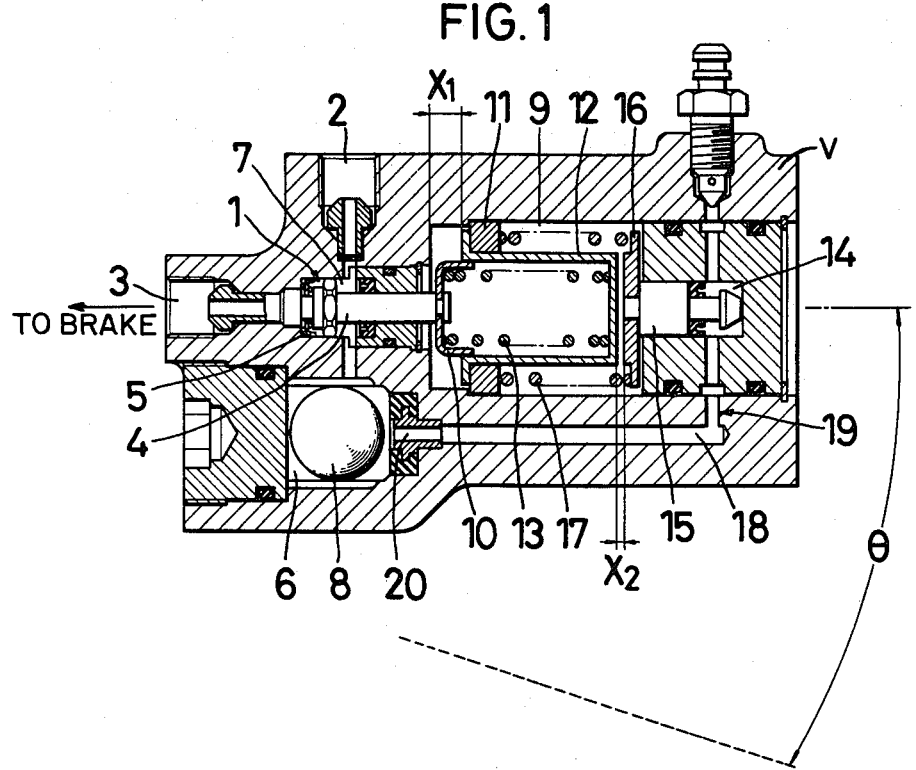
FIG. 1 is a sectional view of a first embodiment of this invention.

Referring first to FIG. 1, the brake pressure control device according to this invention includes a proportioning valve 1 of a known type arranged in a valve body V between an inlet port 2 leading to the master cylinder and an outlet port 3 leading to the rear brake. The proportioning valve 1 comprises a plunger 4 and a valve seat 5. Of course, the proportioning valve may be of a type which comprises a stepped piston and a cone or ball valve seat, such as disclosed in U.S. Pat. No. 3,169,800, for example. An inertia valve chamber 6 is provided which communicates with a valve chamber 7 of the valve 1. A ball 8 is housed in the inertia valve chamber.

To the right of the proportioning valve 1 is arranged a spring chamber 9 into which the plunger 4 projects in liquid-tight and slidable relation with the valve structure. A spring holder 10 is carried by the plunger 4 at the projecting end thereof. The plunger and holder together constitute plunger means. An annular stop 11 is provided on the inner wall of the spring chamber 9. A spring cage 12 is provided in the chamber 9 and has a flange thereon which engages the stop 11 so as to be blocked against rightward movement. An operating spring 13 is held in the spring holder 10 and in the spring cage 12 in a compressed state engaging the rear closed end of the spring holder. Thus, the spring cage 12 is normally kept spaced from the left or front end wall of the spring chamber 9 by a distance $X_1$.

A piston chamber 14 provided to the right of the spring chamber 9 houses a piston 15. A press plate 16 fixed to the forward end of the piston 15 is located at the righthand or rear end of the spring chamber 9. An offset spring 17 is held between the stop 11 and the press plate 16 in a compressed state. The arrangement is such that there normally exists a gap $X_2$ between the rear end of the spring cage 12 and the press plate 16.

The piston chamber 14 communicates with the inertia valve chamber 6 through a line 18. A sealing chamber 19 is constituted by the line 18 and the portion of the piston chamber 14 to the right of the piston.

A basic difference between the arrangement of this invention and conventional control devices of this type is that a gap $X_2$ exists between the rear end of the spring cage 12 and the press plate 16.

Figure 2:
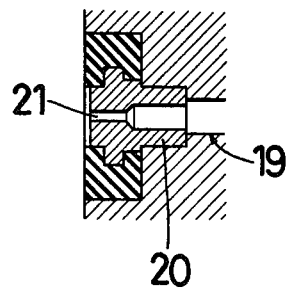
FIG. 2 is an enlarged sectional view of the inlet port to the sealing chamber in the embodiment of FIG. 1.

FIG. 2 shows an example of a sealing chamber inlet 20 which is provided with an orifice 21 to cause a delay in the increase of the sealed-in pressure.

Figure 3:
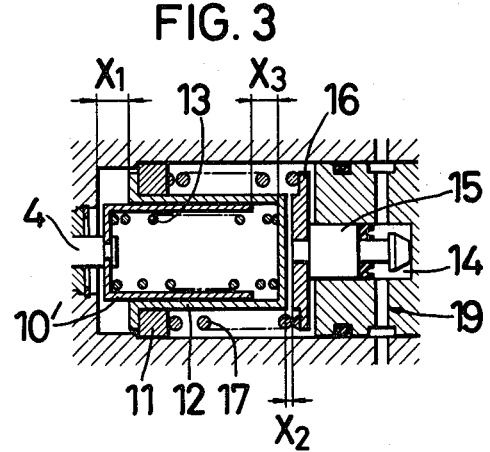
FIG. 3 is a fragmentary sectional view of a second embodiment.

FIG. 3 shows the second embodiment in which the spring holder 10' is much longer than in the embodiment of FIG. 1 so that a gap $X_3$ is left between the right-hand end of the spring holder 10 and the inner surface of the rear end wall of the spring cage 12. The gap $X_3$ is slightly smaller than the gap $X_1$.

Figure 4:
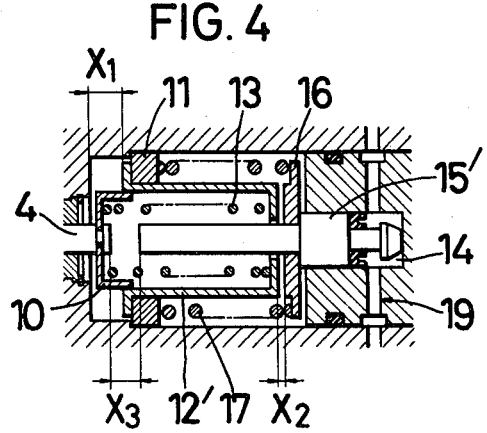
FIG. 4 is a fragmentary sectional view of a third embodiment.

FIG. 4 shows the third embodiment in which the piston 15' extends into the spring cage 12' through the rear or right-hand wall with the same gap $X_3$ normally left between the projecting end of the plunger 4 and the tip of the piston 15'.

The operation of each of the embodiments will be described below.

Figure 5:
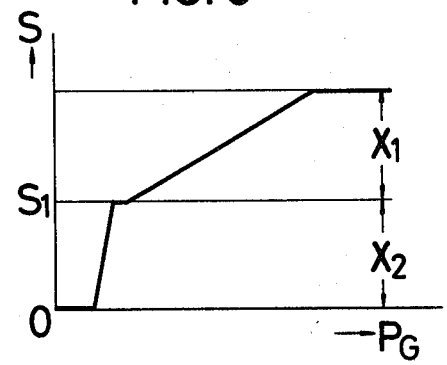
FIG. 5 is a graph showing the relationship between the sealed-in pressure and the piston stroke in the first embodiment of FIG. 1.

Firstly, the operation of the embodiment of FIG. 1 will be described with reference to the graph of FIG. 5 which shows the relationship between the pressure PG sealed in the sealing chamber 19 and the stroke S of the piston 15. The stroke will be zero until the sealed pressure PG exceeds a balance point depending on the force of the offset spring 17. Beyond that point, the piston 15 advances while compressing the offset spring 17 engaged by the press plate 16. When the piston stroke S reaches $X_2$, the piston 15 engages the spring cage 12 so that the stroke S will not increase for some time. (The stroke at this point is referred to as $S_1 = X_2$.) When the sealed pressure PG exceeds a point where the force of piston 15 is equal to the force of the spring 13 plus that of the offset spring 17, the piston 15 advances further toward the plunger while compressing these springs until the lefthand end of the spring cage 12 abuts the end wall of the spring chamber 9. In other words, the spring cage moves a distance $X_1$ while the piston stroke S increases continuously.

It will be understood from the foregoing that the compression of the spring 13 by the piston does not start until the piston stroke exceeds a value $S_1$. This means that the movement of the piston up to the length of stroke $S_1$, which occurs at a lower pressure than the designed sealed-in pressure for the unloaded condition, does not have any effect in increasing the cut-in point of the proportioning valve.

Since such a movement of the piston 15 does not affect the operation of the proportioning valve, the volume of the sealing chamber 19 increases even in the unloaded condition. This causes some pressure drop in the sealing chamber 19 and a suction force at the inlet port 20 to the sealing chamber. This effect is particularly noticed if an orifice is provided upstream of the sealing chamber as will be described later with reference to FIG. 2.

The suction force acts on the ball 8 and makes the inertia valve (formed by the ball 8 and a valve seat) more responsive to the deceleration of the vehicle. This solves such problems as poor responsiveness of the ball 8, too late scaling of the chamber 19, excessive sealed-in pressure or too high a cut-in point in the unloaded condition, resulting from the fact that the piston 15 does not affect the plunger 4 at all in the unloaded condition as it does in the prior art devices.

As is well known, the control device of this type is mounted on the vehicle at an angle $\theta$ with respect to its horizontal axis. When the brake pedal is actuated and some braking pressure is produced in the master cylinder, an inlet pressure $P_1$ is applied to the inlet port 2 and the outlet pressure $P_0$ from the outlet port 3 will be the same as $P_1$ until the proportioning valve 1 starts to operate. (See FIG. 6.) When the inlet pressure exceeds a certain level, the plunger 4 is urged backward by the fluid pressure against the bias of the spring 13. Thereafter, the fluid pressure reduced by the proportioning valve in a known manner will be supplied to the rear brake. As will be seen from the graph of FIG. 6, the curve during the pressure decrease does not necessarily lie on the curve during the pressure increase because the characteristic curve of the valve has a hysteresis.

The cut-in point is established as described below.

As the brake pressure from the master cylinder and thus the inlet fluid pressure $P_1$ increases, the pressure PG in the sealing chamber also increases. When the pressure PG reaches a certain value, the piston starts to move. When the piston stroke exceeds the value $S_1$, the piston starts to compress the spring 13.

On the other hand, as the brake pressure increases, the vehicle will be decelerated. When the rate of deceleration reaches a predetermined value, the ball 8 or the inertia valve operates to close the sealing chamber 19, sealing-in the fluid pressure then therein. Now, the force urging the plunger 4 leftwardly or in its opening direction becomes fixed, thus determining the cut-in point.

If the increase of the brake pressure is slow, the delay in the operation of the inertia valve does not pose any problem because a pressure substantially correctly corresponding to the gross vehicle weight is sealed-in. However, in the conventional control devices, if the brake pressure increases rapidly, that is, upon rapid braking, the pressure in the sealing chamber 19 increases too much before the inertia valve operates. The performance curve will be as shown by dotted lines (with the cut-in point b) instead of solid lines (with the cut-in point a) on the graph of FIG. 6.

In accordance with the present invention, as described before, the piston 15 moves without affecting the operation of the proportioning valve in the initial stage of pressure increase in the sealing chamber. Therefore, a suction force acts on the ball 8. This means that the inertia valve comprised of the ball 8 and the valve seat is more responsive to the deceleration than in the conventional control device. Therefore, sealing of excessive fluid pressure and too high a cut-in point are prevented and brake performance more correctly corresponding to the load of the vehicle or the gross vehicle weight is obtained.

Figure 6:
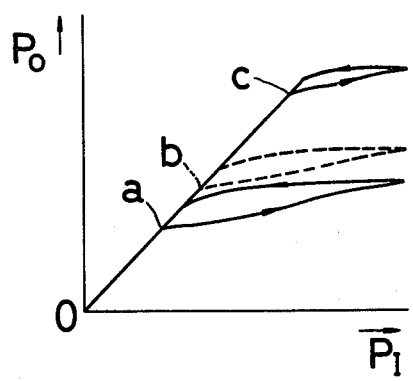
FIG. 6 is a brake performance curve for the first embodiment of FIG. 1.

The cut-in point C on the graph of FIG. 6 is the cut-in point when the load is large.

If the above-mentioned arrangement is insufficient to prevent the cut-in point from increasing above a desired point, an orifice 21 may be provided upstream of the sealing chamber 19, preferably in the inlet port 20 to the chamber, to retard the increase of the fluid pressure, as shown in FIG. 2. The movement of the piston produces a certain amount of flow through the orifice even in the unloaded condition. Since the orifice is not in the main line for the rear brake system, there is no danger of the brake working too late even if the front brake system should fail.

Figure 7:
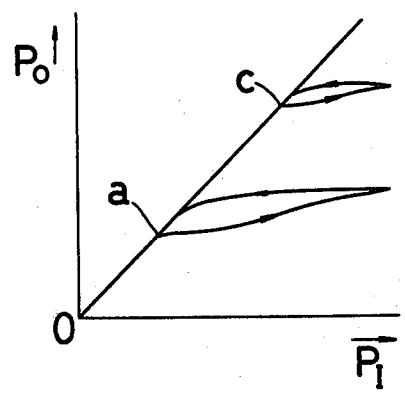
FIG. 7 is a brake performance curve for the embodiments of FIG. 3 and FIG. 4.

In the embodiments of FIG. 3 and FIG. 4, when the stroke of the piston 15 or 15' exceeds a predetermined value ($X_2+X_3$ for the embodiment of FIG. 3 and $X_3$ for that of FIG. 4), the piston 15 or 15' directly pushes the plunger 4, i.e. through cage 12 and holder 10' in the case of FIG. 3 and through the extension (unnumbered) on the piston 15' in the case of FIG. 4. This ensures that if the input fluid pressure is excessive, that is, under loaded conditions or upon the failure of the front brake system, the brake pressure is not reduced at all because the proportioning valve does not operate. If the vehicle is overloaded or if the front brake system fails, in the embodiment of FIG. 1, the cut-in point is at C whereas in the embodiments of FIG. 3 and of FIG. 4, it does not occur but rather the output fluid pressure $P_0$ continues to increase in proportion to the input pressure, as shown in FIG. 7.

It will be understood from the foregoing that the present invention provides a brake pressure control device comprising an inertia valve having an improved responsiveness to the deceleration particularly upon rapid braking because the piston moves without affecting the operation of the proportioning valve in the initial stage of its stroke, due to the presence of a gap $X_2$ between the piston and the spring cage. This ensures that the cut-in point always appears at a point more correctly corresponding to the load of the vehicle.

Also, the provision of an orifice upstream of the sealing chamber further increases the above-described effect.

What I claim:

1. A deceleration-sensitive brake pressure control device for a vehicle, comprising:
   a valve body having a proportioning valve chamber for receiving brake fluid under pressure and supplying it to a brake;
   a pressure proportioning valve in said proportioning valve chamber and having a valve seat and a plunger means movable relative to said valve seat in response to the pressure of the brake fluid;
   said valve body having an inertia body chamber communicating with said proportioning valve chamber;
   said valve body having a sealing chamber having an opening thereinto from said inertia body chamber;
   an inertia body movable in said inertia body chamber in response to deceleration of the vehicle for closing the opening to said sealing chamber;
   a piston means communicating with said sealing chamber and movable in response to the pressure in said sealing chamber;
   a spring cage movably positioned between said plunger means and said piston means and normally spaced from said piston means a predetermined distance;
   stop means for limiting the movement of said spring cage away from said plunger means;
   a first spring having one end engaging said plunger means and the other end engaging said spring cage and normally in compression when said spring cage is engaged with said stop means for urging said plunger means in the valve opening direction; and
   a second spring having one end engaged with said piston means and having the other end blocked against movement relative to said valve body for resisting movement of said piston means toward said plunger means, whereby said piston means is moved to abut said spring cage and urge said spring cage and said plunger means to compress said first spring in the valve opening direction only after said piston means has moved toward said plunger means through the space between said piston means and said cage by compressing said second spring.

2. A deceleration-sensitive brake pressure control device as claimed in claim 1 wherein said piston means has an extension thereon extending toward said plunger means and normally spaced from said plunger means a distance greater than said predetermined distance, whereby said piston means engages said plunger means directly for urging it in the valve opening direction after it has moved toward said plunger means for said predetermined distance and compressing said second spring and then further moved for said greater distance for compressing both said second spring and said first spring.

3. A deceleration-sensitive brake pressure control device as claimed in claim 1 wherein said cage is normally spaced a distance from said plunger means, whereby said piston means engages said plunger means directly through said cage for urging it in the valve opening direction after it has moved toward said plunger means for said predetermined distance and compressing said second spring and then further moved for said distance at which said cage and plunger means are normally spaced for compressing both said second spring and said first spring.

4. A deceleration-sensitive brake pressure control device as claimed in claim 1 further comprising a restricted flow orifice upstream of said sealing chamber.

* * * * *